455-611 AU 233 EX
FIP8106 XR 3,459,942

Aug. 5, 1969 J. E. ANDERSON 3,459,942

HIGH FREQUENCY LIGHT SOURCE

Filed Dec. 5, 1966

Inventor:
Jon E. Anderson,
by Paul A. Frank
His Attorney.

3,459,942
HIGH FREQUENCY LIGHT SOURCE

Jon E. Anderson, Madison, Wis., assignor to General Electric Company, a corporation of New York Filed Dec. 5, 1966, Ser. No. 599,272
Int. Cl. H04b *9/00;* H01s *3/00*
U.S. Cl. 250—199 1 Claim

ABSTRACT OF THE DISCLOSURE

A high frequency pulse light communication system includes a low impedance transmission line having a source of high frequency pulse signals driving it at one end and a light emitting semiconductor laser diode shunted by an impedance matching capacitor terminating the other end of the line.

Figure 1:
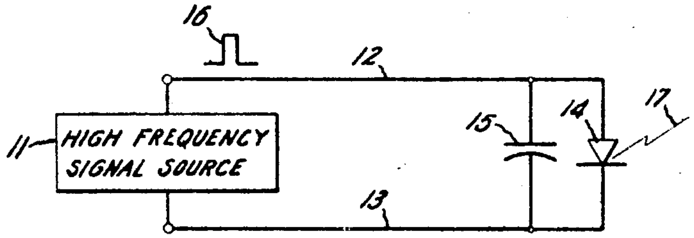

This invention relates to a high frequency light emitting source.

More specifically the invention relates to pulsed high frequency light sources employing laser diodes and suitable for use in high frequency pulsed light communication systems, and the like.

The discovery of the laser has provided to communication engineers a new tool for exploiting portions of the traveling wave energy spectrum heretofore unavailable for communication purposes, etc. With the advent of the solid state gallium arsenide light emitting semiconductor laser diode device, made available by General Electric Company in the early 1960's, a commercially practical device for implementing communication apparatus employing light transmission communication links, became a reality. However, to employ these devices in practical communication equipment, it is necessary to provide some means for driving or exciting the devices into and out of the light emitting (lasing) mode of operation at extremely high frequencies or rates.

For the purpose of illustration, the following example is cited. In order to fully exploit the potential of a laser diode in a communication system of the above-mentioned type, it is necessary that the laser diode be pulsed on and off at extremely high rates. These rates should correspond to a light pulse duration (pulse width) of about 1 to 100 nanoseconds. By definition one nanosecond is equal to one-one billionth of a second (that is, $10^9$ nanoseconds equals one second). Thus, the extremely high frequency pulsed character of the light signal to be emitted by the laser diode can be appreciated. In order to provide an apparatus capable of pulsing a laser diode on and off at these extremely high rates, the present invention was devised.

It is therefore a primary object of the present invention to provide a pulsed high frequency light source employing laser diodes and capable of use in pulsed communication systems with high data rates etc.

In practicing the invention a high frequency light emitting source is provided which includes a low impedance transmission line. A source of high frequency electric signals are operatively coupled to one end of the low impedance transmission line, and a light emitting semiconductor device is operatively coupled across the remaining end of the transmission line. To complete the high frequency light emitting source, an impedance matching capacitor is coupled in parallel circuit relationship with the light emitting semiconductor device. In preferred embodiments of the invention the light emitting semiconductor device is a light emitting laser diode, and the source of high frequency electric signals is a source of high current with narrow pulse widths at high repetition rates.

Figure 2:
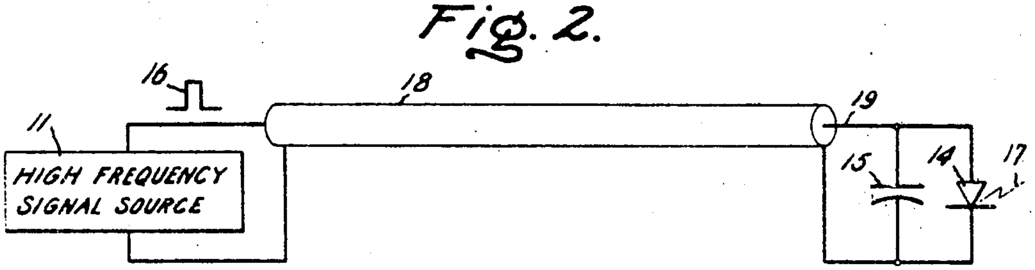

Other objects, features, and many of the attendant advantages of this invention will be appreciated more readily as the same becomes better understood by reference to the following detailed description, when considered in connection with the accompanying drawings, wherein like parts in each of the several figures are identified by the same reference character, and wherein:

FIGURE 1 is a schematic circuit diagram illustrating the construction of a new high frequency light emitting source according to the invention; and FIGURE 2 is a schematic circuit diagram of a modified form of the light emitting source shown in FIGURE 1.

The high frequency light emitting source shown in FIGURE 1 is comprised by a low impedance transmission line driven by a source of high frequency pulsed electric signals 11 connected to one end thereof. In the embodiment of the invention shown in FIGURE 1, the low impedance transmission line is comprised by a two wire transmission line formed by a pair of conductors 12 and 13 having the source of high frequency pulsed electric signals 11 coupled across one end thereof. One example of a suitable two-wire transmission line would be a line having an impedance $Z_0$ which is greater than one tenth of an ohm and less than five tenths of an ohm $$(0.1<Z_0<0.5)$$

The low impedance transmission line 12 and 13 is terminated by a light emitting semiconductor laser diode 14 coupled across the remaining end of the conductors 12 and 13. To complete the high frequency light emitting source, an impedance matching capacitor 15 is connected in parallel circuit relationship with the light emitting semiconductor laser diode 14. As an example of a suitable impedance matching capacitor for use with the above-mentioned low impedance transmission line, capacitor 15 may have a capacitance in the neighborhood of 0.02 microfarad. With an impedance matching capacitor of this size and a low impedance transmission line exhibiting an impedance value in the neighborhood of the range of values cited above, a reasonable impedance match may be retained prior to and throughout the pulsed lasing mode of operation of the laser diode 14.

The light emitting semiconductor laser diode device 14 preferably comprises a commercially available laser diode. One example of a suitable commercially available laser diode is the diffused gallium arsenide infrared laser diode, type SNX–100, offered for sale by the Texas Instruments Corporation of Dallas, Tex. This device is an infrared light source which is electrically equivalent to a p-n junction diode, and when biased in the forward direction, the device emits light of a relatively narrow spectral width in the near infrared region of the spectrum. Other commercially available laser diode devices also would be satisfactory for use in the present invention.

It is a well recognized law of electrical engineering that for the most efficient transfer of power from a signal source to a load, there must be a reasonable impedance match between the source and the load. In this particular invention it is desirable that the impedance of the laser diode 14 be matched to that of the transmission line 12 and 13. However, laser diode 14 has the property of a very high impedance (much greater than one ohm) before it conducts (that is, before it assumes the lasing mode of operation wherein it emits light), and exhibits a very low impedance (much less than 0.01 ohm) when laser emission occurs. Thus, if only the laser diode 14 terminates transmission line 12 and 13, a matched condition would occur only during that period while the diode impedance approximates the characteristic line impedance $Z_0$ of the transmission line 12, 13. Thus, the problem would present itself of choosing the optimum characteristic line impedance $Z_0$ so that mismatch would not prevent the laser diode 14 from lasing, or fail to provide an optimum terminating impedance match during the lasing mode of operation so as to significantly widen the light pulses.

To overcome the above problem, impedance matching capacitor 15 of appropriate size is shunted across laser diode 14 to correct for the nonlinear impedance characteristic of the laser diode, as well as to provide an increased peak current level during the lasing mode of operation of laser diode 14. By this arrangement a reasonable impedance match may be retained prior to and throughout the light pulse duration. Assuming that the transmission line has an impedance value $Z_0$ in the neighborhood of the above cited range, and that an impedance matching capacitor 15 of the above mentioned size, is employed, then the following mode of operation takes place during lasing of laser diode 14.

The laser diode 14 initially has an impedance much larger than the impedance $Z_0$ of transmission line 12, 13 prior to the initial current wave front of a pulsed signal such as that shown at 16 initially reaching the diode. However, at this point in the operation, capacitor 15 provides a much lower impedance so that the shunted pair 14 and 15 provide a match. Therefore, capacitor 15 will absorb most of the initial energy of signal pulse 16, and provide time for laser diode 14 to turn on. As soon as the laser diode 14 begins to emit light energy (schematically illustrated at 17), its impedance drops drastically. At this point in the operation of the circuit, energy is dumped from the previously charged capacitor 15 as well as from the remainder of the current pulse on the transmission line 12, 13, into laser diode 14 to produce the pulsed light emission. Since the laser diode impedance is much less than the transmission line impedance $Z_0$ at this point in the operation, the impedance matching capacitor 15 will be effectively discharged fully to result in a much larger pulse of current through laser diode 14 as well as to assist in the impedance match. Therefore, not only will the impedance match be improved by the use of capacitor 15, but also increased current through laser diode 14 will result. As a consequence as increased intensity light pulse of narrow duration is produced.

FIGURE 2 of the drawings illustrates a modified form of the invention. In FIGURE 2 a coaxial transmission line comprised by an outer conductor 18 and an inner conductor 19 is substituted for the two wire transmission lines 12 and 13 of the arrangement shown in FIGURE 1. In all other respects, the embodiment of the invention shown in FIGURE 2 is similar to the FIGURE 1 arrangement, and operates similarly. It might also be noted that while only single channel circuit configurations are disclosed, the invention lends itself to employment in multichannel and multiplexed communication systems because of its extreme simplicity, small size, and small energy consumption characteristics.

Accordingly, from the foregoing description it can be appreciated that the invention provides a pulsed high frequency light source employing laser diodes which is suitable for use in high frequency pulse light communication systems and the like.

Having described several embodiments of a pulsed high frequency pulse light emitting source constructed in accordance with the invention, it is believed obvious that other modifications and variations of the present invention are possible in the light of the above teachings. It is therefore to be understood that changes may be made in the particular embodiments of the invention described which are within the full intended scope of the invention as defined by the appended claims.

What I claim as new and desire to secure by Letters Patent of the United States is:

1. A high frequency light emitting source including in combination a low impedance transmission line, a source of high frequency and high current pulsed electric signals operatively coupled to one end of said low impedance transmission line, a light emitting semiconductor laser diode operatively coupled across the remaining end of said low impedance transmission line, and an impedance matching capacitor connected in parallel circuit relationship directly across the light emitting semiconductor laser diode, wherein the impedance of the parallel connected capacitor and nonconducting and conducting light emitting laser diode both reasonably match the impedance of the transmission line, and the impedance of the capacitor is much greater than the impedance of the conducting light emitting laser diode so that the capacitor is charged when the light emitting laser diode is nonconducting and is discharged through the light emitting laser diode to increase the current level when the light emitting laser diode is rendered conductive, the resulting high frequency light pulses that are produced having a pulse width of less than 100 nanoseconds' time duration.

References Cited

UNITED STATES PATENTS

| | | | |
|---|---|---|---|
| 2,858,421 | 10/1958 | Touvet | 250—199 |
| 3,245,002 | 4/1966 | Hall | 250—199 XR |
| 2,921,184 | 1/1960 | Fruengel | 250—199 |
| 3,296,538 | 1/1967 | Stabilito | 331—94.5 |
| 3,351,901 | 11/1967 | Padberg | 250—199 |

RALPH BLAKESLEE, Primary Examiner

ALBERT J. MAYER, Assistant Examiner

U.S. Cl. X.R.

331—94